United States Patent [19]

Missmahl et al.

[11] 4,238,881
[45] Dec. 16, 1980

[54] APPARATUS FOR ASSEMBLING ELONGATED PIECES INTO BUNDLES

[75] Inventors: Bodo Missmahl, Düsseldorf; Georg Streit, Mettmann, both of Fed. Rep. of Germany

[73] Assignee: Malmedie & Co. Maschinenfabrik GmbH, Düesseldorf, Fed. Rep. of Germany

[21] Appl. No.: 50,123

[22] Filed: Jun. 19, 1979

[30] Foreign Application Priority Data

Jun. 19, 1978 [DE] Fed. Rep. of Germany ....... 2826738

[51] Int. Cl.³ .............................................. B23P 19/00
[52] U.S. Cl. ........................................ 29/822; 100/7; 198/425
[58] Field of Search .............. 29/822; 100/7; 198/422, 198/425

[56] References Cited

U.S. PATENT DOCUMENTS

| 3,871,288 | 3/1975 | White | 100/7 |
| 3,956,982 | 5/1976 | Hill et al. | 100/7 |

Primary Examiner—Lowell A. Larson

[57] ABSTRACT

An assembling apparatus is disclosed for straight, directed and cut-to-length wire pieces. A support frame is mounted elastically to a base frame and the support frame is jolted by jolting means. A guiding sheet is at least in part attached to the support frame for transporting and directing the wire pieces. Assembly means include at least one tilting lever which can be controllably lifted up or lowered down. Bundling means includes a belt band to bundle a defined amount of wire pieces.

16 Claims, 3 Drawing Figures

APPARATUS FOR ASSEMBLING ELONGATED PIECES INTO BUNDLES

BACKGROUND OF THE INVENTION

1. Field of the invention

The present invention relates to an aligning and bundling apparatus for coordinating a certain amount of elongated pieces into a bundle.

2. Description of the prior art

Klusmier et al in U.S. Pat. No. 3,837,465 issued Sept. 24, 1974 discloses an assembly and transfer apparatus for elongated elements, for example bars and the like, produced by a rolling mill. A pair of spaced opposite guide surfaces define an assembly and transfer zone. Carrier members protrude into and are movable along the length of the zone. The elongated elements are fed laterally into the zone through an inlet at an upper location. The elements are initially retained adjacent to the inlet and against the carrier members and are assembled at the upper end of the zone. The carrier members are moved downwardly along the length of the zone for assembling and for carrying the assembled elements to a lower second location. The elements are received at the second location and are then carried laterally to a third location, where they are strapped to a dense bundle, and then to a fourth location for delivering the bundles. This apparatus is constructed to avoid that the individual elements become cocked at an angle relative to each other (commonly referred to as jackstrawing or from twisting about the longitudinal axis of the assembly (commonly referred to as "cabling").

Where a jackstrawing and/or cabling condition exists, the cocked or twisted elements may be bent or distorted in the bundling, typing or strapping operation. Cabled elements are difficult to extract from a bundle and may be difficult to use in certain operations.

The above apparatus may be suitable for the assembly, typing and transfer of bars and the like. However, the apparatus is much too expensive and cumbersone for the bundling of straight wire pieces such as, for example, welding electrode core wires. The conventional apparatus is also not capable to assure in the case of small diameters of wire that no jackstrawing or cabling occurs. In order to avoid jackstrawing and cabling for small diameter wires additional equipment would be necessary, which would have to assure an exact parallel feeding of the wire pieces to the pivoted levers.

SUMMARY OF THE INVENTION

It is an object of the present invention to provide an assembly apparatus for placing straight wire pieces into parallel position with the ends aligned. It is another object of the present invention to bundle a desired amount of wires into a strapped bundle. Furthermore, the assembly apparatus is desired to be adaptable to wires of various lengths.

These and other objects and advantages will become evident from the description which follows.

BRIEF DESCRIPTION OF THE INVENTION

The invention relates to an assembly apparatus for straight wire pieces and more particularly to welding electrode core wires. The wires are run through a wire drawing machine and through an aligning machine. The wires are place in parallel position relative to each other and are collected in a controllably liftable and lowerable assembly apparatus comprising at least one rocking lever. The wires are bundled by a belt band located between the rocking levers. The apparatus comprises a support frame mounted elastically to a base frame. A jolting means is provided for jolting the support frame. A guide sheet arrangement is attached at least in part to the support frame for transporting and aligning the wire pieces. An assembly means comprises a rocking lever, which can be controllably lifted up or lowered down. A bundling means provides a belt band to bundle a defined amount of wire pieces.

Preferably the jolting means attached to the support frame is a vibrator and another vibrator is attached to the rocking lever. The guide sheet arrangement can comprise a cylindrical sheet with one end of the arcuate directrix being substantially vertical and the other end of the directrix being at a slight angle relative to a horizontal position. A cylindrical surface consists of all straight lines parallel to a given line and intersecting a given curve and said given curve is called directrix. A feeder sheet can join to the cylindrical sheet with the feeder sheet ending above the rocking lever and the feeder sheet being connected to at least one vibrator. The feeder sheet can be mounted on the support frame and the feeder sheet can be tiltable around a hinge with the hinge axis being normal to the direction of advance of the wire pieces on the feeder sheet. A lever rod can be provided for a hydraulic or pneumatic jack attached to the feeder sheet. A sheet can be provided in close spatial relationship to the vertical edge of the cylindrical sheet.

The free end of the side of the cylindrical sheet at a slight angle can be vertically bent down and end above the end of the feeder sheet. The vertically bent down end forms a cascade and a tiltable flap sheet can be located in this area. The tiltable flap sheet can be pivoted on a shaft and have a weight loaded lever attached for pressing the free end of the flap sheet against the bent end of the cylindrical sheet. Loading elements which easily yield to bending forces can be located in the area of the feeder sheet for guiding the motion of the wire pieces. Preferably the loading elements are formed by at least one metallic roller chain attached to the flap sheet.

The rocking lever can be journalled in a rocking bearing below the guide sheet arrangement and the lever is preferably bent like U-shape, open in the upward direction, into which the belt band is placed and wherein the rocking lever is operated by means of a hydraulic or pneumatic jack. A control unit for the hydraulic or pneumatic jacks can be fed from sensors located in a side wall of the assembly apparatus in the area of the wire pieces to be assembled. A tiltably mounted pneumatic jack can have a piston, which is linked to an arm of the rocking lever.

The assembly apparatus of the present invention achieves that the arriving straight wire pieces are moved in the guide sheet arrangement and exactly parallel in one layer to the rocking lever and are distributed on this rocking lever. The transfer from the guide sheet arrangement to the rocking lever as final collecting means proceeds at such a small difference of height level that the wire pieces remain parallel during this transfer. The wire pieces can be lifted from the rocking lever in a desired quantity by means of a belt band. Upward folding of part of the guide sheet arrangement interrupts during this time the feeding of wire pieces.

It is critical for free and unimpeded flow of wire pieces to the rocking lever that the guide sheet arrangement as well as the rocking lever are in continuous vibration, which can be provided by a jolting means. The jolting means can be coordinated with the rocking lever and/or the support frame.

The assembly apparatus can be sturdily constructed from welded parts. A considerable noise attenuation can be achieved by employing sandwich sheet metal and thus render the apparatus environmentally desirable. The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which is shown one of the various possible embodiments of the invention.

DETAILED DESCRIPTION OF THE PREFERRED EMBODIMENT

Figure 1:
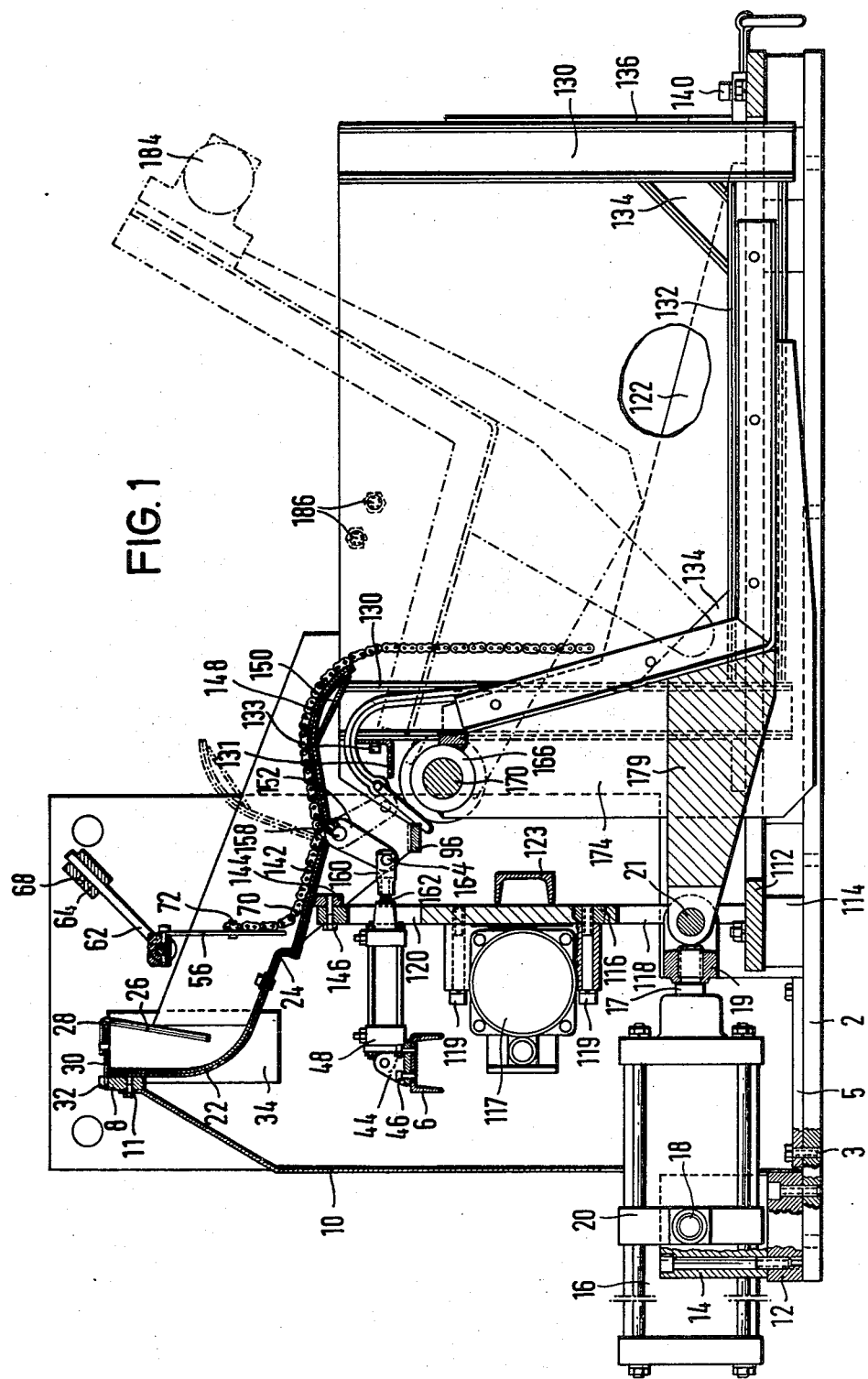
FIG. 1 is a view of a section of the assembly apparatus.
Figure 2:
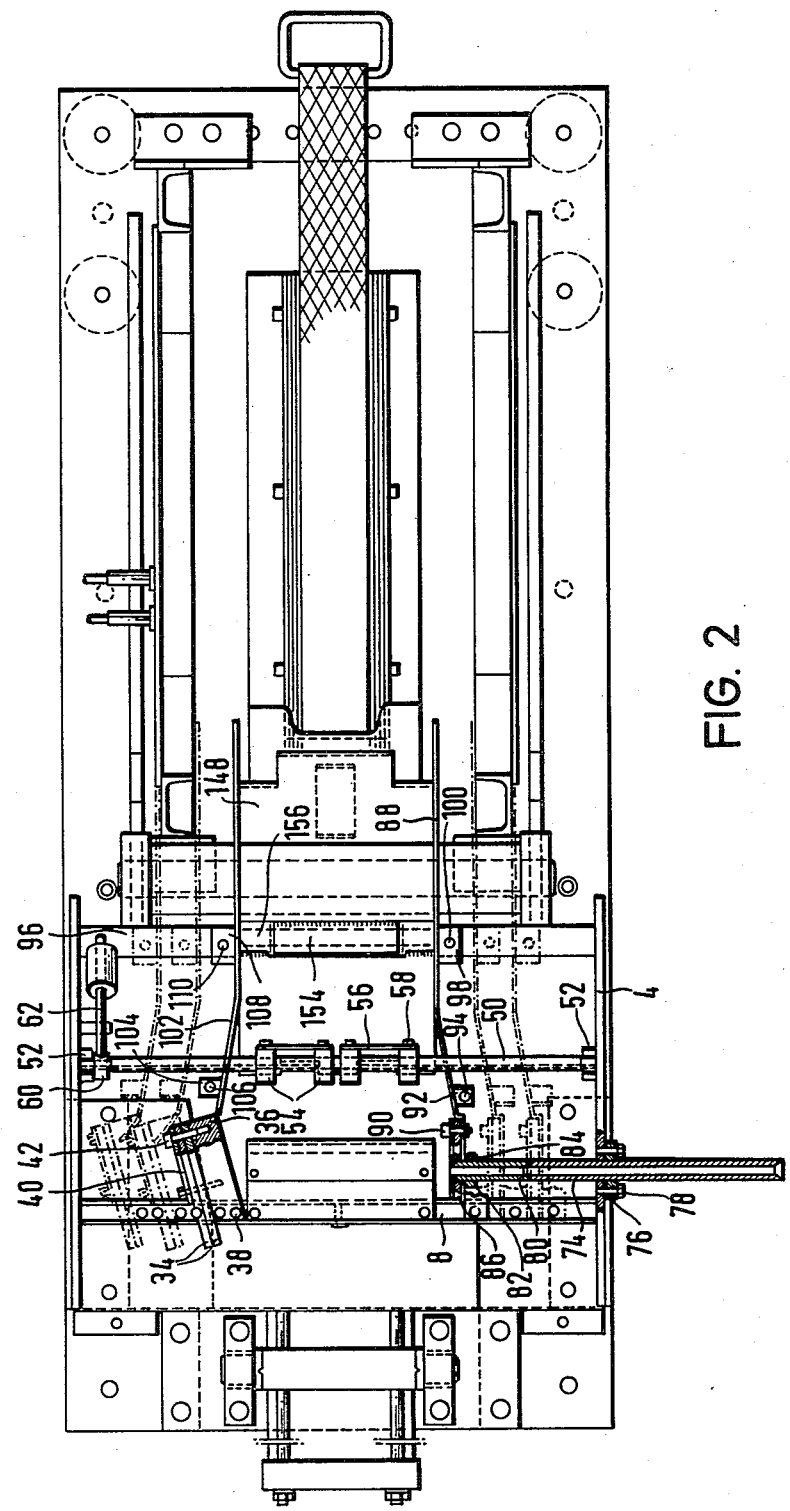
FIG. 2 is a plan view of the assembly apparatus.
Figure 3:
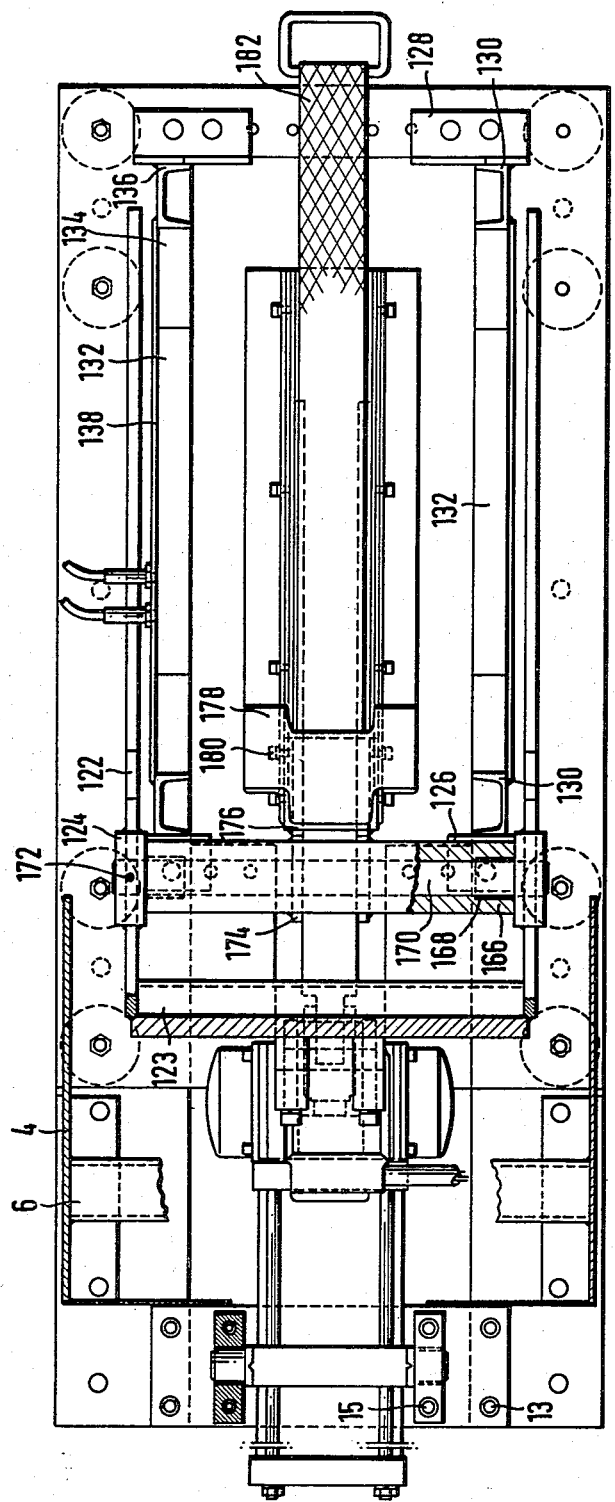
FIG. 3 is a plan view of the assembly apparatus in part as a section.

Referring now to FIG. 1. The assembly apparatus according to the present invention comprises a base frame 2 which has by means of clamping bolts 3 attached the threaded flanges 5 of two side walls 4. The side walls 4 extend over only a small part of the total length of the base frame 2 and are at about the middle of their height connected together with a traverse 6 having a U-shaped cross-section and are at about their upper edge connected together with a traverse 8 made from flat-bar steel.

A sheet metal wall 10, which is attached to the base frame 2 and to the traverse 8 by means of clamping bolts 11 ends this region of the side walls 4. A plate 12 attached to the base frame 2 by means of clamping bolts 13 forms a support for the pedestals 14, which are attached to the plate 12 with clamping bolts 15. A hydraulic or pneumatic jack 16 is placed between the pedestals 14 by means of a hinge rod support 20 laid around the jack 16. The hinge rods 18 are attached to the sides of the hinge rod support 20 and the hinge rods 18 engage the pedestals 14.

A piston shaft 17 of the pneumatic jack is screwed into the yoke 19, which is linked with a hinge bar 21 with the arm 179 of the rocking lever 176, 178, which will be later described in detail.

An angle sheet metal 22 is attached to the traverse 8. The angle sheet metal 22 is part of the traverse 8. The angle sheet metal 22 is part of the guide sheet arrangement for the wire pieces. The angle sheet metal 22 is bent to have one of its sides run substantially vertical and to have the other side run downwards. The free end of the inclined downward running side of the angle sheet metal 22 is provided with an end 24 bent down vertically, which ends in the area of a roll-off sheet 142. The bent end 28 of a sheet apron 26 is attached via a support sheet 30 by means of clamping bolts 32 to the traverse 8. In addition, double plastic guide aprons 34 are connected to the traverse 8. For this purpose a support plate 36 is screwed to the traverse 8 with clamping bolts 38. The guiding aprons 34 are attached to the support plate 36 by means of clamping bolts 42 and a pressure plate 40. A bearing block 44 is attached to the traverse 6 with screws 46. The bearing block 44 serves to attach tiltably a further hydraulic or pneumatic jack 48.

The side walls 4 have axle boxes 52 rotatably supporting a shaft 50. A flap sheet 56 is attached to the shaft 50 with clamping pieces 54, which are tightened with clamping bolts 58 against the shaft 50. A hub 60 attached to the shaft 50 supports a lever 62, which has a weight 64 slidably attached with a set screw 68.

The shaft 50 with the flap sheet 56 is located above the vertically bent end 24 of the angle sheet 22 and the free end of the flap sheet 56 contacts the bend end 24 of the angle sheet 22. By moving the weight 64 it is possible to adjust the pressure exerted by this end of the flap sheet 56 against the bent end 24 of the angle sheet 22.

One or more roller chains 70 are arranged in parallel and are attached to the flap sheet 56 with clamping bolts 72 and are resting on the roll-off sheets 142, 148. The straight wire pieces are fed to the guide sheet arrangement through a wire tube 74, which is slidable and settable in a set collar 76. The set collar 76 is attached to the side wall 4 of the assembly apparatus by means of clamping bolts 78. In order to provide for adaptation to various lengths of wire, the wire guide tube 74 can be provided with a wire guide tube extension 80, which is placed with a set collar 82 and a set screw 84 between the support plate 86 and the wire guide tube 74. A side guide sheet 88 is attached to the support plate 86 with clamping bolts and nuts 90.

A cover plate 92 is attached to the angle sheet 22 by means of a clamping bolt and nut 94 and provides additional support for the guide sheet 88. An additional cover plate 98 is provided, which is attached to traverse 96 between the side walls 4 with a clamping bolt 100.

In the same way there is provided an additional adjustable guide sheet 102 on the other side of the guide sheet arrangement. This side guide sheet 102 is attached to the angle sheet 22 by means of a cover plate 104 and a clamping bolt with nut 106 and is attached to the traverse 96 with an additional cover plate 108 and a clamping bolt 110.

A support frame 112 is attached with nuts 115 via vibration dampers 114 located at its corners. A vertical rear wall 116 is welded to the support frame 112. A vibrator 117 is attached to the support frame at about the middle of its height by means of clamping bolts 119. The rear wall 116 has a lower recess 118 for passage of the piston shaft 162 of the hydraulic or pneumatic jack 48. The rear wall 116 is additionally strengthened with a welded U-shaped stiffening profile 123. On the side of the support frame 112 are welded bearing blocks 122, which reach to the rear wall 116 and are also welded to the rear wall 116. A bearing seat 124 is placed in each bearing block 122. At the support frame 112 are further disposed side-walls adjustable in their distance. The side walls comprise cover plates 126, 128, vertical support columns 130 with U-shaped profiles, longitudinal beams 132 with U-shaped profile, angle reinforcements 134, struts 136 and side sheets 138. These side walls are attached to the support frame 112 with clamping bolts 140 and in the area of the bearing seats 124 additional diagonal trussing 131 with annular profile is attached with clamping bolts 133. The roll-off sheet 142 is welded to the beam 144. The beam 144 is screwed to the rear wall 116 with clamping bolts 146. A roll-off sheet 148 is tiltable around a hinge comprising a hinge eye 154 at the roll-off sheet 148, two hinge eyes 156 at the roll-off sheet 142 and a hinge axle 158 attached to roll-off sheet 142. The bent end of the roll-off sheet 148 is provided with a support sheet 150. A link lever 152 is attached to the hinge eye 154. The link lever 152 is connected to the fork 160 with the hinge pin 164. The fork 160 is screwed to the piston shaft 162 of the hydraulic or pneumatic jack 48.

A shaft 170 is disposed in the bearing seats 124 of the bearing blocks 122 and is secured against sliding out and turning by means of set screws 172. A support tube 166 is rotatably positioned on shaft 170 by means of bearing bushings. Web plates 174 are welded to the support tube 166 and provide support for a bent rocking lever 176 with a U-shaped profile, which has at its upward directed arm supporting angles 178 attached with clamping bolts 180. The arm 179 is located between the web plates 174 near the bend part of the rocking lever 176 and is, as mentioned above, connected via the hinge pin 21, the yoke 19 with the piston shaft 17 of the pneumatic jack 16. An additional vibrator 184 is disposed at the free end of the rocking lever 176. A belt band 182 is located in the U-shaped profile of the rocking lever 176. The ends of the belt band 182 are provided with loops and protrude so far from the assembly arrangement that the collected wire pieces on the rocking lever 176 and between the side sheets 138 can be lifted by means of the belt band 182. The lifting and lowering of the rocking lever 176 is controlled with detector 186 placed on the side sheet 138. At the start of the assembly process the rocking lever 176 is in the position shown with dash-dotted lines.

The vibrators 117 and 184 are turned on and the wire pieces move through the wire guide tube 74 and possibly the wire guide tube extension 80 to the area between the vertical side of the angle sheet 22 and of the sheet apron 26. The wire pieces bounce against the guide aprons 34 and are thereby braked without being reflected and then roll down the inclined side of the angle sheet 22 towards the bent end 24 of the angle sheet 22 forming a cascade.

At this step the wire pieces are aligned in parallel to each other, since only one piece at a time can move through between the bent end 24 and the free end of the flap sheet 56. The parallel aligned wire pieces move now in one layer along the roll-off sheets 142, 148, which are, as described above, connected with the support frame 112 and thereby subjected to the vibrations generated by the vibrators 117 and 184. The vibrations induce the wire pieces to flow to the rocking lever 176, which is, as mentioned above, initially in the position as shown with dash-dotted lines. The wire pieces collect on the supporting angle 178 of the rocking lever 176 between the side sheets 138. When a defined number of wire pieces is collected the detectors 186 induce a lowering of the rocking lever by actuating a valve in conventional control fashion for the hydraulic or pneumatic jack 16 and the piston shaft of the jack retracts by a corresponding amount.

As soon as the rocking lever 176 has reached the fully pulled out lowest position and a sufficient number of wire pieces has been collected, the latter are lifted and bundled by means of the belt band 182. At the same time the roll-off sheet 148 is folded upward into the position shown with dash-dotted lines in order to avoid interruption of the feeding of wire pieces. In the same manner the feeding of wire pieces can be interrupted for a short time when there is a disturbance in the area of the rocking lever 176.

Since the individual parts of the collecting and guiding arrangement are constructed to be adjustable, the assembly apparatus of the present invention can be set for a variety of lengths of wire. The embodiment set forth is, as mentioned above, intended for welding electrode core wires, which are fabricated in three standardized lengths. Thus, the assembly apparatus of the present invention is adjustable to these three standardized lengths.

It is to be noted that the vibrators 117, 184 can be attached in a different way and at a different place to the support frame 112 and to the rocking lever 176 and that, if desired, one vibrator is sufficient.

Furthermore, two flap sheets parallel to each other can be disposed above the roll-off sheet 142 to control the flow of the parallel aligned wire pieces.

It is furthermore possible to replace the belt band 182 and to dispose between the side sheets 138 and the rocking lever 176 devices for automatic bundling of the wire pieces in order to provide for removal of the wire pieces from the assembly apparatus as finished bundles.

It thus will be seen that there is provided an apparatus which achieves the various objects of the invention and which is well adapted to meet the conditions of practical use.

As various possible embodiments might be made of the above invention, and as various changes might be made in the embodiment set forth above, it is to be understood that all matter herein described or shown in the accompanying drawings is to be interpreted as illustrative and not in a limiting sense.

We claim:

1. Apparatus for assembling straight pieces of wire, directed and cut to length, comprising: a base frame; a support frame mounted elastically to the base frame; jolting means for jolting the support frame; guide sheet arrangement attached at least in part to the support frame for transporting and directing the wire pieces; assembling means comprising at least a rocking lever which can be controllably lifted up or lowered down; and bundling means for providing a belt band to bundle a defined amount of wire pieces.

2. The apparatus as set forth in claim 1, wherein the jolting means is a vibrator attached to the support frame.

3. The apparatus as set forth in claim 1, wherein a jolting means is a vibrator attached to the rocking lever.

4. The apparatus as set forth in claim 3, wherein the guide sheet arrangement comprises a cylindrical sheet one end of the arcuate directrix being substantially vertical and the other end of the directrix being at a slight angle relative to the horizontal direction; and a feeder sheet joining the cylindrical sheet with the feeder sheet ending above the rocking lever and the feeder sheet being connected to at least one vibrator.

5. The apparatus as set forth in claim 4, wherein the feeder sheet is mounted on the support frame.

6. The apparatus as set forth in claim 5, wherein the feeder sheet is tiltable around a hinge, and the hinge axis is normal to the direction of advance of the wire pieces on the feeder sheet.

7. The apparatus as set forth in claim 6, further comprising a hydraulic or pneumatic jack attached to the feeder sheet.

8. The apparatus as set forth in claim 4, further comprising a sheet apron in close spatial relationship to the vertical edge of the cylindrical sheet.

9. The apparatus as set forth in claim 4, wherein the inclined end of the cylindrical sheet is bent vertically down and ends above the end of the feeder sheet and further comprising a tiltable flap sheet located in the area of the cascade formed by the bent down end of the cylindrical sheet.

10. The apparatus as set forth in claim 9, wherein the tiltable flap sheet is pivoted on a shaft which has attached a weight loaded lever for pressing the free end of the flap sheet against the bent end of the cylindrical sheet.

11. The apparatus as set forth in claim 4, further comprising loading elements yieldable to bending forces for guiding the wire pieces located in the area of the feeder sheet.

12. The apparatus as set forth in claim 11, wherein the loading elements are formed by at least one metallic roller chain attached to the flap sheet.

13. The apparatus as set forth in claim 1, wherein the rocking lever is journalled in a rocking bearing below the guide sheet arrangement and is bent in a U-shape opening in the upward direction into which the belt band is placed and wherein the rocking lever is operated by means of a hydraulic or pneumatic jack.

14. The apparatus as set forth in claim 13, further comprising a control unit for the hydraulic or pneumatic jacks fed from sensors located in a side wall of the assembly apparatus in the area of the wire pieces to be collected.

15. The apparatus as set forth in claim 13, further comprising a tiltably mounted jack, the piston of which is linked to an arm of the rocking lever.

16. The apparatus as set forth in claim 1, wherein the wire pieces are welding electrode core wires.

* * * * *